April 10, 1934.  M. G. MARKLE ET AL  1,954,453
DIFFERENTIAL DISK
Filed Dec. 1, 1932
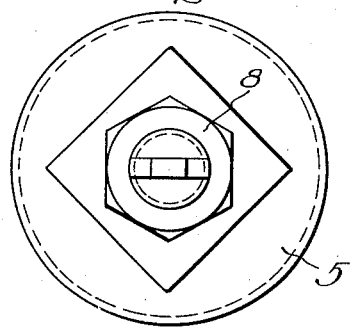
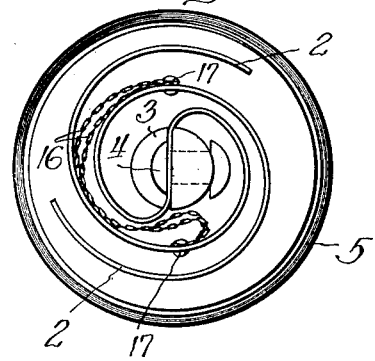
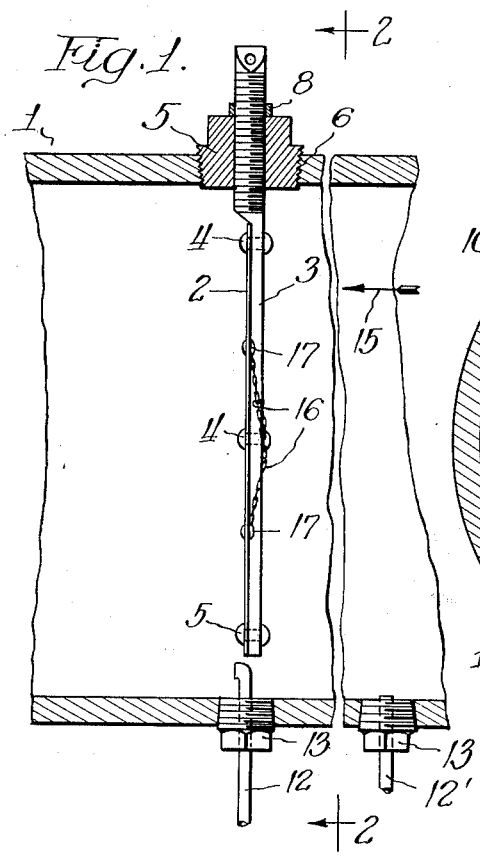
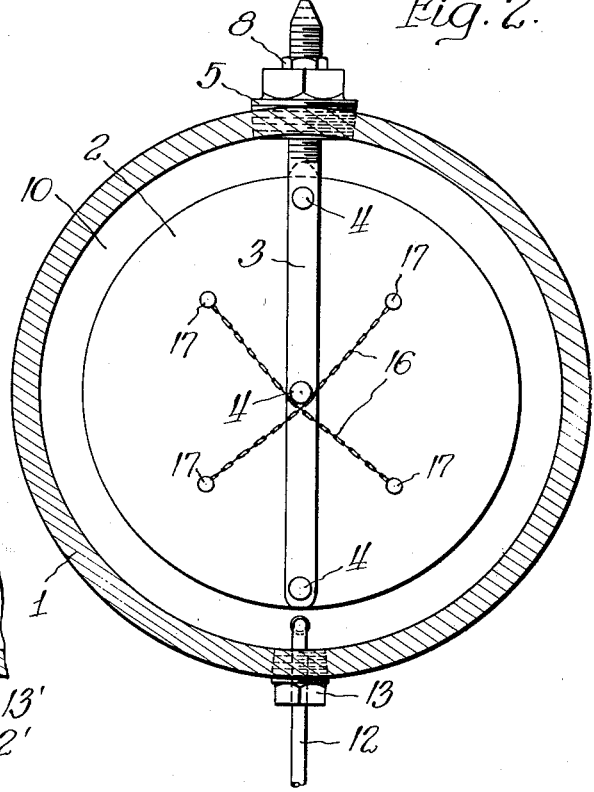
Inventors:
Mathew G. Markle,
Loren W. Tuttle.
By Brown, Jackson, Boettcher & Dienner
Attys.

Patented Apr. 10, 1934

1,954,453

UNITED STATES PATENT OFFICE 1,954,453

DIFFERENTIAL DISK

Mathew G. Markle, Maywood, and Loren W. Tuttle, Mount Prospect, Ill.

Application December 1, 1932, Serial No. 645,130

12 Claims. (Cl. 137—75)

This invention relates to differential disks or orifice plates for use in pipe lines, and to the method of installing such disks in a pipe line.

The differential disk is a device for creating restriction in a pipe line to produce a pressure differential which is a function of the velocity of fluid flow. This pressure differential may be used as a measurement of the rate of fluid flow or to control other devices for controlling other equipment where the control is to be in accordance with the rate of fluid flow. For example:

(a) Controlling throttling valves to control the rate of fluid No. 1 as a definite percentage of the rate of flow of fluid No. 2.

(b) Controlling pressure regulating apparatus in relation to the rate of fluid flow (as a governor or booster system).

(c) Turning equipment on and off at certain magnitudes of fluid flow.

In the general practice of the past, disks of the kind here considered have been held in place by means of a pair of rings or circular flanges which constituted a short length of the pipe line. The assembly of such a unit in a pipe line is rather expensive. Also, the insertion of such a unit into an existing pipe line is a complicated and expensive task which involves taking the pipe line out of service for a considerable length of time. It is an object of the present invention to simplify this procedure.

The diaphragm or orifice plate of the present invention is made of spring steel which is highly resilient and may be wound into a roll of comparatively small diameter without stressing the material beyond its elastic limit. The roll is then inserted through a comparatively small hole in the pipe and permitted to uncoil under its natural resiliency, the opening being thereafter closed by a screw plug or the like.

It is another object of the present invention to provide an arrangement whereby an orifice plate may be adjusted without interrupting the service and without requiring the usual by-pass arrangements. We accomplish this result by mounting the orifice plate on a stem which extends through the pipe and which may be turned to move the orifice plate.

It is a further object of the present invention to provide an orifice plate which is rather rigid against flexing in one direction, as under the influence of the fluid stream, and yet may be flexed in the opposite direction rather freely, whereby the same may be wound into a roll for insertion into the pipe through a relatively small opening.

The attainment of the above and further objects of the present invention will be apparent from the following specification, taken in conjunction with the accompanying drawing forming a part thereof.

Figure 1 is a fragmentary longitudinal section, through a pipe, showing our invention applied thereto;

Figure 2 is a sectional view taken along the line 2—2 of Figure 1;

Figure 3 is an enlarged top view of the plug carrying the orifice plate; and

Figure 4 is a diagrammatic view illustrating the manner of coiling the orifice plate preparatory to inserting the same into the pipe line.

Reference may now be had more particularly to Figures 1 and 2. A portion of a pipe line is indicated in general by the reference numeral 1. The line 1 may comprise a gas pipe of appreciable diameter, although it may comprise a water pipe, or a pipe for conveying any other fluid medium. Within the pipe is located a plate 2 that is supported on a stem 3 as by means of a number of rivets 4. The stem 3 threads into a threaded plug 5 which is threaded into a tapped hole 6 in the pipe 1. The stem 3 threads through the nut 5 and is locked in position by a lock or jam nut 8. As may be seen from Figure 1, one face of the stem 3 is slabbed off to provide a flat surface for the orifice plate 2. The plate 2 is formed of clock-spring steel and has a high degree of elasticity. It may be coiled into a roll of very small diameter in proportion to the diameter of the disk 2, without stressing the material beyond its elastic limit, so that it tends to uncoil to a flat surface under its natural resiliency. It is to be noted that the plate 2 constitutes a restriction within the pipe 1, the area of the restriction being equal to the area of the space 10 between the plate 2 and the pipe 1. As the fluid flowing through this pipe passes through the restricted area there will be a drop in fluid pressure, which drop varies with variations in velocity of fluid flow in accordance with known laws. A small tube 12 extends into the pipe line through a plug 13 and opens in the pipe at the region 10 of reduced pressure. A similar tube 12' extends into the pipe line through a similar plug 13' located at a sufficient distance from the diaphragm to be outside of the region of the reduced pressure created thereby. These tubes extend to suitable apparatus responsive to the pressure difference, such as measuring instruments, or actuating instruments that are actuated responsive to a predetermined pressure difference to perform any predetermined operation. The pressure drop at the orifice varies with variations in velocity of fluid flow according to known laws. From a measurement of the pressure drop at the orifice it is possible to calculate the rate of fluid flow.

The direction of fluid flow is indicated by the arrow 15 in Figure 1. It is to be noted that the stem 3 is on the upstream side of the spring plate 2. Since the pressure on the upstream side of the spring plate 2 exceeds the pressure on the downstream side, there is a tendency for the plate to flex towards the downstream side, especially at the periphery of the plate. Such flexing is, of course, undesirable, since it alters the area of the space 10 and thus introduces an error in the pressure differential created by the diaphragm. To prevent such flexing of the plate, or to reduce it to a negligible amount, there are provided a pair of steel ropes or chains 16—16 which extend between rivets 17—17 on the upstream side of the plate, and over the stem 3. When the plate 2 is in its normal flat position the ropes or chains 16—16 are taut. Since the ropes or chains extend over the stem 3 it is apparent that they will resist any tendency of the plate 2 to flex in one direction, that is, in the direction in which the fluid stream tends to flex it. While we have shown only two chains 16—16 it is, of course, to be understood that a greater number may be used if desired. Also, while we have shown the two chains extending diagonally of one another it is, of course, to be understood that any other arrangement may be used. For instance, one chain may extend between the two upper rivets 17—17 and the other chain between the two lower rivets.

An explanation will now be given of the manner of inserting the plate 2 into the pipe line. The nut 5 is threaded onto the threaded end of the stem 3 and then the diaphragm plate is coiled into a helical roll of a diameter less than the diameter of the nut 5. This is indicated in Figure 4. At this time the chains or ropes 16—16 hang loosely between their supporting rivets 17—17. The plate 2 thus rolled up is inserted through the opening 6 in the pipe 1. After the plate 2 has entered the pipe it uncoils under its natural resiliency and assumes the flat shape shown in Figures 1 and 2. Thereafter the nut 5 is screwed home in the hole 6 and the position of the plate 2 in the pipe is adjusted by turning the nut 5 and/or the threaded end of the stem 3 to locate the plate 2 centrally of the pipe.

While we have shown the orifice plate 2 as comprising an imperforate disc arranged in the pipe so that the fluid flow will be on the outside of the disk, it is to be understood that the present disk may comprise an annular ring, the outer periphery of which contacts with the periphery of the pipe and the inner periphery of which defines an opening through which the fluid flows. Such a disk can also be made of spring steel and wound into coil form for insertion into the pipe, in the same manner as the disk 2 above described. The arrangement of the disk as shown is, however, preferable to one of the annular type, in that a disk of the type shown in Figures 1 and 2 may be turned at an angle to the axis of the pipe in order to increase the effective area of the space 10, or it may be turned at 90° to the position shown, in order to eliminate any restrictive action. The diaphragm may then be brought into action whenever desired, by merely turning the threaded end of the stem 3 to bring the diaphragm disk into the position shown in Figures 1 and 2. In the event that velocity measurements are to be made when the disk 2 is at an angle to that shown in Figures 1 and 2, suitable allowance must be made for this angular deviation, either in the calculations or in the calibration of the instrument connected to the tubes 12 and 12'.

While we have shown the plugs 13 and 13' spaced 180° from the plug 5, this is merely for the purpose of facilitating illustration of the invention. The plug 13 may be located at the orifice plate anywhere along the periphery of the pipe. In many cases it is most convenient to space this plug about 30° from the plug 5.

From the description given above it is apparent that our improved orifice plate may be installed at a cost much less than that of a standard installation. We eliminate the necessity of the usual orifice fittings, flanges, and other parts that are necessary when the conventional orifice plate is used. Our disk is adjustable, so that a differential range of zero to a maximum for any given flow may be secured by varying the angular position of the disk in the pipe. In the past it has been necessary to change the orifice plates if the flow varied widely. The disk of the present invention may be installed without appreciable interruption of service, and may be adjusted in the conduit without any interruption of service. In the prior practice it was necessary to make provision for by-passing the orifice plate. This is not necessary in the present invention.

While we have herein shown a preferred form of our invention it is, of course, to be understood that the invention is not limited to the precise arrangement herein shown, the same being merely illustrative of the principles of the invention.

What we consider new, and desire to secure by Letters Patent, is:

1. A pipe having a circular lateral opening, and an orifice member in the pipe and of a diameter greater than the diameter of the opening, said member being of spring metal and flexible into a roll of a diameter less than that of the opening without stressing the material beyond its elastic limit.

2. A pipe having a circular lateral opening, an orifice member in the pipe and of a diameter greater than the diameter of the opening, said member being of spring metal and flexible into a roll of a diameter less than that of the opening without stressing the material beyond its elastic limit, and means for stiffening the member against flexing in one direction while retaining the freedom to flex in the other direction.

3. A pipe having a circular lateral opening, an orifice member in the pipe and of a diameter greater than the diameter of the opening, said member being of spring metal and flexible into a roll of a diameter less than that of the opening without stressing the material beyond its elastic limit, and means for stiffening the member against flexing in the down stream direction in the pipe while retaining the freedom to flex in the other direction.

4. A diaphragm comprising a supporting stem, a spring metal disk carried thereby, and means for preventing flexing of the disk about the stem in one direction while permitting flexing in the opposite direction.

5. A diaphragm comprising a supporting stem, a spring metal disk carried thereby, means for preventing flexing of the disk about the stem in one direction while permitting flexing in the opposite direction, said means comprising cords extending over the stem between fixed points of the disk, all of the cords being located on the same side of the disk.

6. A diaphragm comprising a supporting-reenforcing stem, a disk carried thereby, said stem extending beyond the periphery of the disk and being threaded at its extended portion, and a nut threaded on the stem and provided with external threads for threading the nut into a mounting pipe, said disk being of spring metal of sufficient resiliency to permit coiling of the same into a roll of an external diameter less than the diameter of the nut without stressing the metal beyond its elastic limit.

7. A pipe line, a stem extending into the line, an orifice disk mounted on the stem, said stem extending beyond the surface of the disk, and cords secured between fixed points on the disk on opposite sides of the stem and extending over the stem on the upstream side of the pipe line.

8. In a pipe, an orifice plate pivoted about an axis at right angles to the center line of the pipe, said orifice plate being comparatively highly flexible and means for holding the plate against flexing in one direction.

9. In a pipe line, an orifice plate of spring steel, means external of the pipe for turning the orifice plate to vary the restriction effect of the orifice in the pipe, and means for stiffening the plate against flexing in one direction, while retaining the freedom to flex in the opposite direction.

10. In combiantion, a pipe having an opening through its wall the greatest dimension of which opening is short relative to the interior of cross-section of the pipe, a member closing said opening, and a flexible and resilient orifice member disposed within the pipe and supported from said closure member, said orifice member being normally held extended by its own resiliency and being capable of sufficient distortion for insertion, in its distorted condition, through said opening without exceeding the elastic limit of said member.

11. In combination, a pipe having a relatively small opening through its wall, and a flexible and resilient orifice structure disposed within the pipe, said structure being normally held extended by the resiliency thereof and being capable of sufficient distortion for insertion of the structure through said opening into said pipe without permanent distortion of said structure.

12. In combination, a pipe having a relatively small opening through its wall, a closure member secured in said opening, a highly resilient and flexible orifice plate within the pipe, a stem secured to said member and to said plate and extending substantially the full width of the latter, and means cooperating with said stem for preventing flexing of the plate in one direction lengthwise of the pipe.

MATHEW G. MARKLE.
LOREN W. TUTTLE.